United States Patent [19]
Berg

[11] Patent Number: 5,886,707
[45] Date of Patent: Mar. 23, 1999

[54] METHOD FOR REAL-TIME ON-DEMAND INTERACTIVE GRAPHIC COMMUNICATION FOR COMPUTER NETWORKS

[76] Inventor: David A. Berg, 44 Bell St., East Palo Alto, Calif. 94303

[21] Appl. No.: 670,525

[22] Filed: Jun. 27, 1996

Related U.S. Application Data

[62] Division of Ser. No. 615,986, Nov. 20, 1990, Pat. No. 5,544,317.

[51] Int. Cl.$^6$ .................................................. G06F 15/16
[52] U.S. Cl. .......................................... 345/433; 345/329
[58] Field of Search ........................... 395/200.34, 200.6, 395/200.31, 133, 329, 330, 331, 335, 610

[56] References Cited

U.S. PATENT DOCUMENTS

| | | | |
|---|---|---|---|
| 4,209,839 | 6/1980 | Bederman | 395/425 |
| 4,710,868 | 12/1987 | Cocke et al. | 395/311 |
| 4,813,013 | 3/1989 | Dunn | 395/333 |
| 4,853,875 | 8/1989 | Brown | 395/200.58 |
| 4,858,112 | 8/1989 | Puerzer et al. | 395/200.6 |
| 4,937,784 | 6/1990 | Masai et al. | 395/674 |
| 4,974,173 | 11/1990 | Stefik et al. | 395/331 |
| 5,008,853 | 4/1991 | Bly et al. | 395/331 |
| 5,123,089 | 6/1992 | Beilinski et al. | 395/200.67 |
| 5,206,934 | 4/1993 | Naef, III | 395/200.34 |
| 5,418,912 | 5/1995 | Christenson | 395/200.64 |
| 5,422,999 | 6/1995 | Travis et al. | 395/200.47 |
| 5,442,771 | 8/1995 | Filepp et al. | 395/200.49 |
| 5,544,317 | 8/1996 | Berg | 395/200.65 |

OTHER PUBLICATIONS

"Easy CAD" v.1:08, Evolution Computing 1987, pp. 177–251, 253–265.
Stallings, "Data and Computer Communications", 1988, pp. 137–141.
Simpson, "Windows into Networks", Systems Integration, Jan. 1990, p. 39 (10).

*Primary Examiner*—Stephen S. Hong
*Attorney, Agent, or Firm*—Flehr Hohbach Test Albritton & Herbert LLP

[57] ABSTRACT

The simultaneous, real time graphical information is shared between two or more intelligent work stations linked together in conversation via a network. Transmission of the essence of a graphical image is accomplished by fixed and variable length portions. The fixed portion describes the type of command and the size or length of the variable length portion. The variable length portion describes the detailed information need to properly process. Thus, the complete length of data is known a priori. While a network is constipated or congested and a drawing operation is being performed by a user, the communication endpoints are configured as non-blocking, commands are stored in a FIFO (first-in, first-out) queue, and the operating system reports how much of the drawing operation was transferred. After the network becomes unconstipated, writing of any partially written command or stored commands in the queue are completed. The graphical image may be displayed in a window or canvas designated for drawing. By transmitting the parameters defining the object and its commands, the speed of the transmission is increased over pixel-by-pixel transmission.

43 Claims, 7 Drawing Sheets

METHOD FOR REAL-TIME ON-DEMAND INTERACTIVE GRAPHIC COMMUNICATION FOR COMPUTER NETWORKS

RELATED APPLICATIONS

This is a Division of Application Ser. No. 07/615,986, filed 20 Nov. 1990, now U.S. Pat. No. 5,544,317.

BACKGROUND OF THE INVENTION

1. Field of the Invention

The present invention relates to graphics and drawing applications for computers, and more particularly to a method for the interactional presentation of graphics through a coupled network of intelligent computer work stations.

2. Brief Description of the Prior Art

Many presentation graphics and drawing applications exist for computers. Some notable examples are MacDraw for Apple Macintosh computers and SunDraw for Sun Microsystems work stations. These programs allow the user to prepare graphical drawings depicting virtually any subject matter. However, they are limited in that they allow only one person to work on the drawing at a time; they do not allow interactive networking of the graphical drawings.

Methods and computer programs do exist which allow users to share information over a network simultaneously, but these are not graphically oriented. The most notable example of this is a program called TALK, which is available as part of 4.3 BSD UNIX. This program allows one user using a work station to initiate a conversation with another user on a different work station. The program allows only the transfer of textual information. Once a conversation is started, the program splits the screen horizontally. The characters inputted by user A appear on the top half of A's screen, and simultaneously appear on the lower half of the screen on the user B's work station. In like manner, when user B types on B's work station, the input appears on the top half of B's screen and the bottom half of user A's screen. In addition to the fact that the TALK program only allows sharing of textual information, it is limited in that the conversation can be between only two users.

There is also a freely available public domain program for the X-Windows system called WScrawl which allows users to share graphical information. However, it works by taking advantage of special features of X-Windows. A simple program is run which opens a single window on each of multiple machines. Then graphics drawn in one window is replicated in the other windows by making identical X-Windows protocol requests. This differs from the current invention in several ways. First, there is only one program being run. Second, the graphics being drawn is not reduced to its essence and then transmitted. Rather, the graphics are merely drawn in multiple windows which are located on different machines. This approach has any disadvantages. First of all, there is no way to distinguish between what multiple users have drawn; everything is merged together. Second, since the essence of the graphic is not transmitted, there is no way for another user to "grab" the image and modify it. Third, and possibly most importantly, this scheme will work only under the X-Windows system. There is no way to make it interoperate with other windowing systems such as Apple's MacOS or Microsoft's MSWindows. The current invention has none of these restrictions.

Finally, the PostScript page description language has been used to transmit graphical information over a network, most notably in Sun Microsystems NeWS (Network Extensible Windowing System). However, PostScript has no facilities for describing the interactions which a user might engage in when using a drawing program. For example, PostScript has no means of indicating that a specific object has moved from one location to another, or that an object has been cut. In fact, the notion of a graphical object is alien to PostScript, which is suited mainly to describing static images so they can be printed.

SUMMARY OF THE INVENTION

It is an object of the present invention to allow the simultaneous, real-time sharing of graphical information over a network between two or more intelligent work stations on a network.

It is another object of the present invention to minimize the data necessary to describe the graphical information, for the rapid transmittal of the data between work stations.

It is a further object of the present invention to avoid using pixel-by-pixel description and transmission of data describing a graphical image, such that the speed of transmission is increased.

It is yet another object of the present invention to develop and utilize a protocol including a series of commands each having a fixed data bit length portion and a description portion having a variable data bit length.

It is yet a further object of the present invention to provide a series of commands which describe the type of graphical manipulation that is being conducted, the type of graphical figure upon which it is being conducted and the location of the screen bits at which it is being conducted, such that each of the terminals in the network are provided with sufficient information to replicate the graphical production of the generating work station.

It is still another object of the present invention to provide a simplified set of commands which is concise for rapid transmission and reception.

The user of a work station (user A) has a means of inputting graphical information to a work station, such as a graphical drawing program. As graphical information is input by user A, it is reduced to a minimal description and an identifier is assigned to it. This description and identifier is termed an object description, and the object description plus other information is formulated into a command that is then transmitted via the network to all other work stations engaged in the conversation. When the other work stations in the conversation receive the command over the network from work station A, they depict that information from the command on the local display in an area (window or canvas) designated for that purpose.

Each command involves a division of instructions into a command type portion having a fixed length and a graphical object description portion having a variable length, in order to transmit data structures that describe graphical objects and operations on those objects.

It is an advantage of the present invention that it allows the simultaneous, real-time sharing of graphical information over a network between two or more intelligent work stations on a network.

It is another advantage of the present invention that it minimizes the data necessary to describe the graphical information, for the rapid transmittal of the data between work stations.

It is a further advantage of the present invention that it avoids using pixel-by-pixel description and data describing a graphical image, such that the speed of transmission is increased.

It is yet another advantage of the present invention that it develops and utilizes a protocol including a series of commands each having a fixed data bit length portion and a description portion having a variable data bit length.

It is a further advantage of the present invention that it provides a series of commands which describe the type of graphical manipulation that is being conducted, the type of graphical figure upon which it is being conducted and the location of the screen bits at which it is being conducted, such that each of the terminals in the network are provided with sufficient information to replicate the graphical production of the generating work station.

It is still another advantage of the present invention that it provides a simplified set of commands which is concise for rapid transmission and reception.

The foregoing and other objects, features and advantages of the present invention will become apparent from the following detailed description of the preferred embodiments which make reference to the several figures of the drawing.

IN THE DRAWING

DETAILED DESCRIPTION OF THE PREFERRED EMBODIMENT

Figure 1:
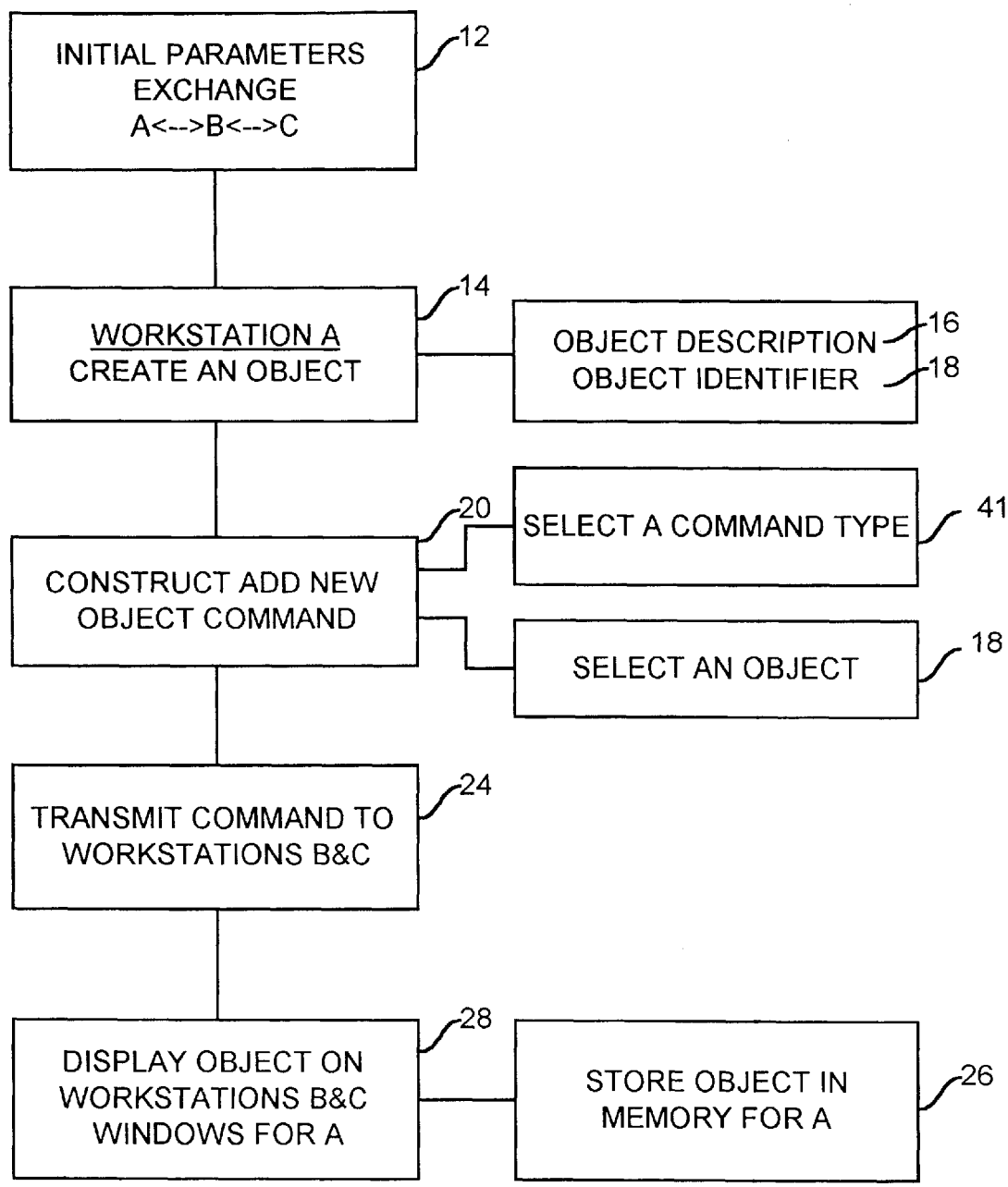
FIG. 1 is a schematic diagram of the communication of graphical information between work stations.

Referring to FIG. 1, when a session or conversation is begun between two or more work stations, they exchange certain information. This information includes a list of other users already involved in the conversation, the revision level each program is using, and possibly details such as the size of the canvas (virtual drawing area) each is using locally. This is referred to as the initial parameter exchange 12.

A work station which is becoming involved in the conversation for the first time will attempt to connect to the other members of the conversation. After the initial parameter exchange, the work station newly added to the conversation will be sent a complete description of all objects on the screen of each of the work stations already involved. With this method, new parties can be included in the conversation in a real-time, on demand basis.

The user of a work station (user A) has a means of inputting graphical information into A's work station, such as a graphical drawing program 14. As graphical information is input by user A, it is reduced to a minimal object description 16 and an object identifier 18 is assigned to it. This object description 16 and object identifier 18 plus other information described below is combined in an add new object command 20, and the command 20 is then transmitted 24 via the network to all other work stations engaged in the conversation, such as work stations B and C in FIG. 1. When the other work stations in the conversation receive the information over the network from work station A, they store the information 26 in a portion of memory reserved for work station A, and they depict that information from the command on the local display in an area (window or canvas) designated for that purpose 28.

Figure 2:
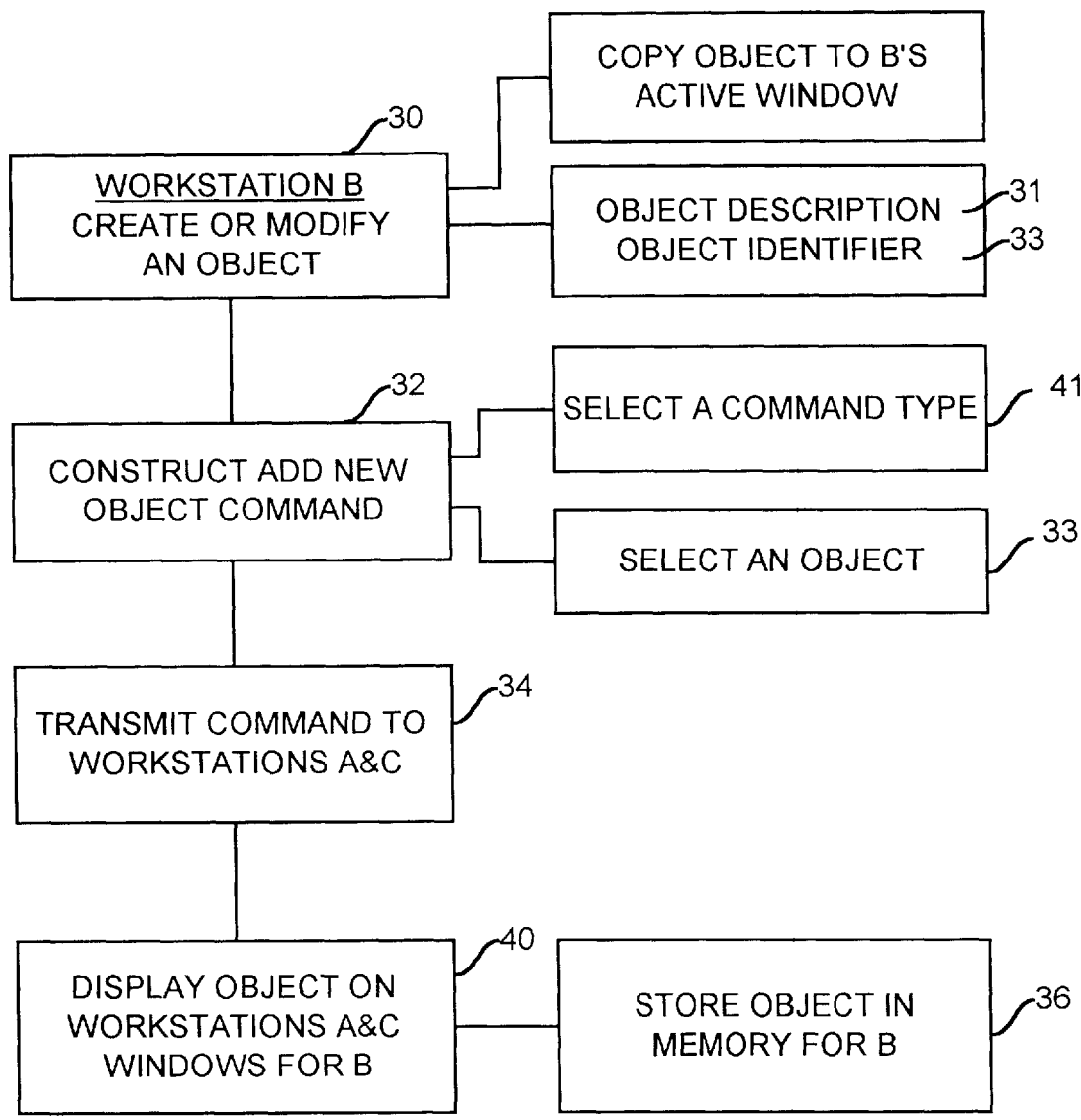
FIG. 2 is a further schematic diagram of the communication of graphical information between work stations.

In like manner, as depicted in FIG. 2, when a user of a remote machine, such as work station B, inputs graphical information 30, the object is depicted on her machine, reduced to its essence as an object description 31 and an object identifier 33, and it is combined in an add new object command 32, and transmitted 34 to all other work stations in the conversation, such as work stations A and C in FIG. 2, for memory storage 36 and for display in windows 40 reserved for input from work station B. A user can't modify another users drawing on the other user's work station, but a user can pick up a received drawing and copy it from memory 36 to her drawing area. She can then modify the copied drawing and it is transmitted to the other work stations.

When a user copies the drawing of another user to her drawing area, the preexisting drawing in her drawing area is erased from the screen. In the preferred embodiment, the sequence of commands that were utilized to create the erased drawing are retained in the user's memory storage. At a later time, the user can recall the erased drawing to her computer screen for further modification. Because the entire sequence of commands which were utilized to create the drawing are retained in computer memory, further commands to modify the drawing can be initiated based upon the object identifiers that are associated with the command sequence of the recalled drawing.

For the purposes of drawing graphical objects, there are at least 5 basic operations which a user would perform: creation, resizing, movement, aggregation and deletion. When an object is created on machine A, an indication of the creation of a new object is sent to every other machine in the conversation, including a description of the object 16, and a unique object identifier 18 is sent with the new object. That information forms the basis of each command. The object identifier 18 is used subsequently if the object is referred to in a subsequent operation (e.g., deleted, etc.). When each other machine receives notification of the creation of a new object on machine A, it adds the object to the list of objects it maintains in memory 36 for machine A and draws that object on its screen that represents the output of work station A.

For some objects, most notably text, it is more efficacious for the information about the object to be disseminated as the object is being created. For such instances, an indication of the commencement of object creation is sent, followed by data describing the development of the object and terminated by an indication of object completion.

Figure 3:
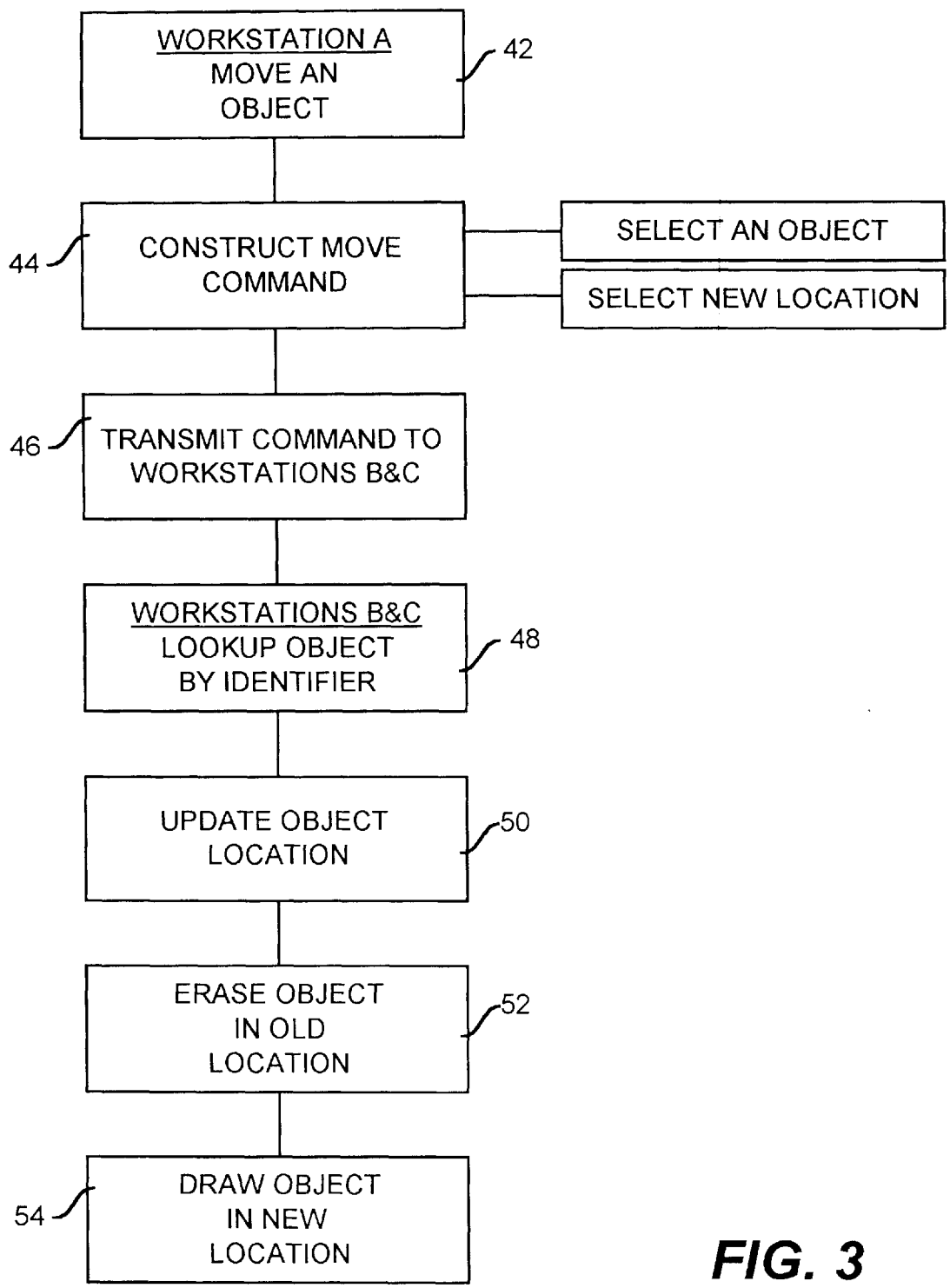
FIG. 3 is a schematic diagram of the method for moving a graphical object depicted upon the computer screens.

If the user of machine A performs another operation (resizing, movement, etc.) on an object, a command 20 reflecting this operation is constructed by selecting a command type 41 that is sent to all other machines, this command 20 includes the unique identifier 18 for the object, and a complete description of what was done. For example, as depicted in FIG. 3, suppose user A moves an object she has already drawn from one place to another (42). An object move command is constructed 44 specifying the object identifier of the object moved and the relative displacement of the new location of the object 44. This is transmitted to work stations B and C 46. Work stations B and C independently look up the object specified in the move command 48. The object location maintained in the object description data structure in machines B and C is updated 50. Work stations B and C erase the depiction of the object in the old location 52. Then work stations B & C draw the object in the new location 54.

Figure 4:
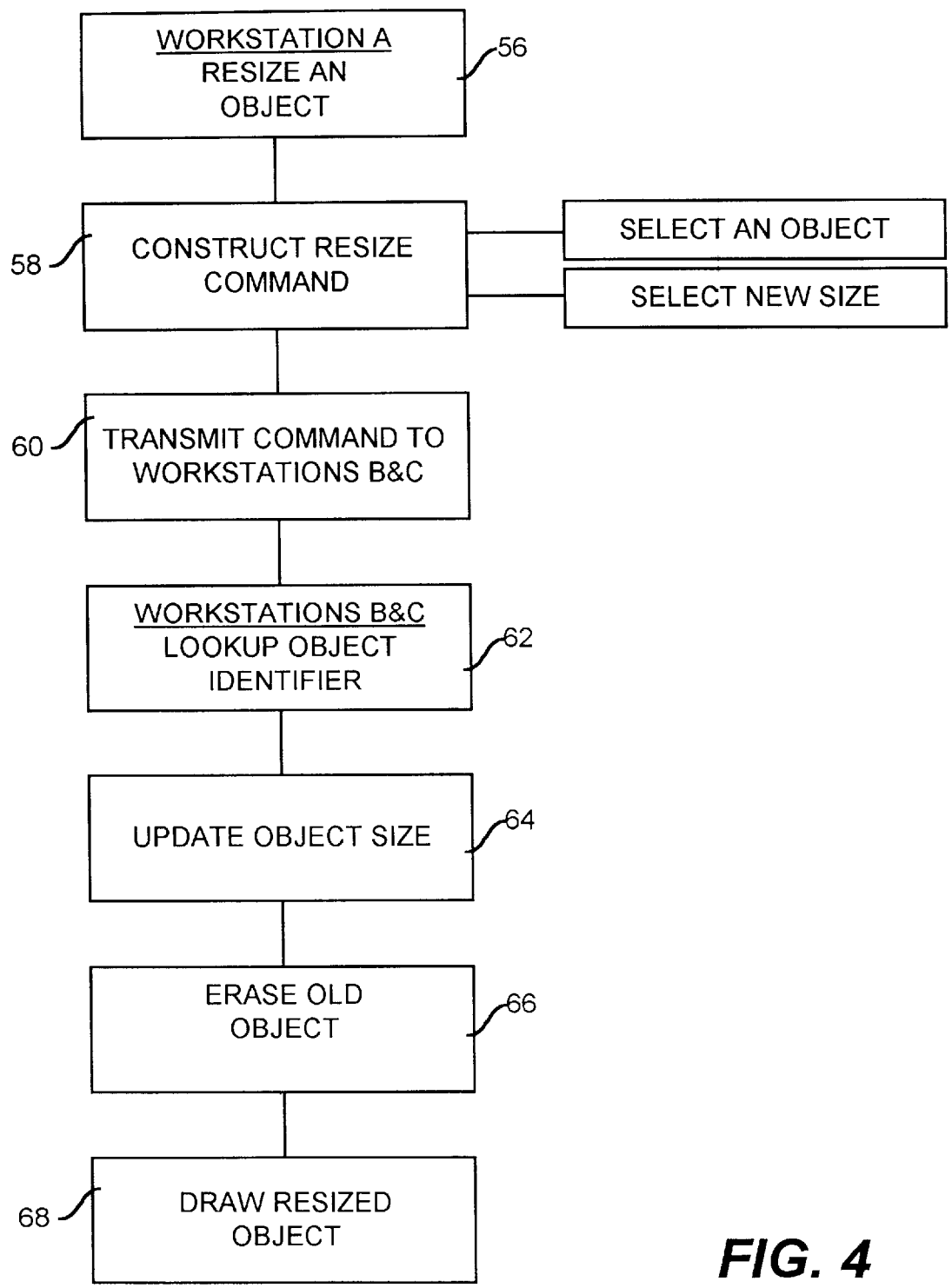
FIG. 4 is a schematic diagram of the method for resizing an object depicted upon the computer screens.

If user A resizes an object 56, as depicted in FIG. 4, an object resize command containing the object identifier and information describing the new object size and shape is constructed 58. This is transmitted to work stations B and C 60. Work stations B and C look up the object 62. They update the object information 64; then they erase the old object 66 and draw the resized object 68.

Figure 5:
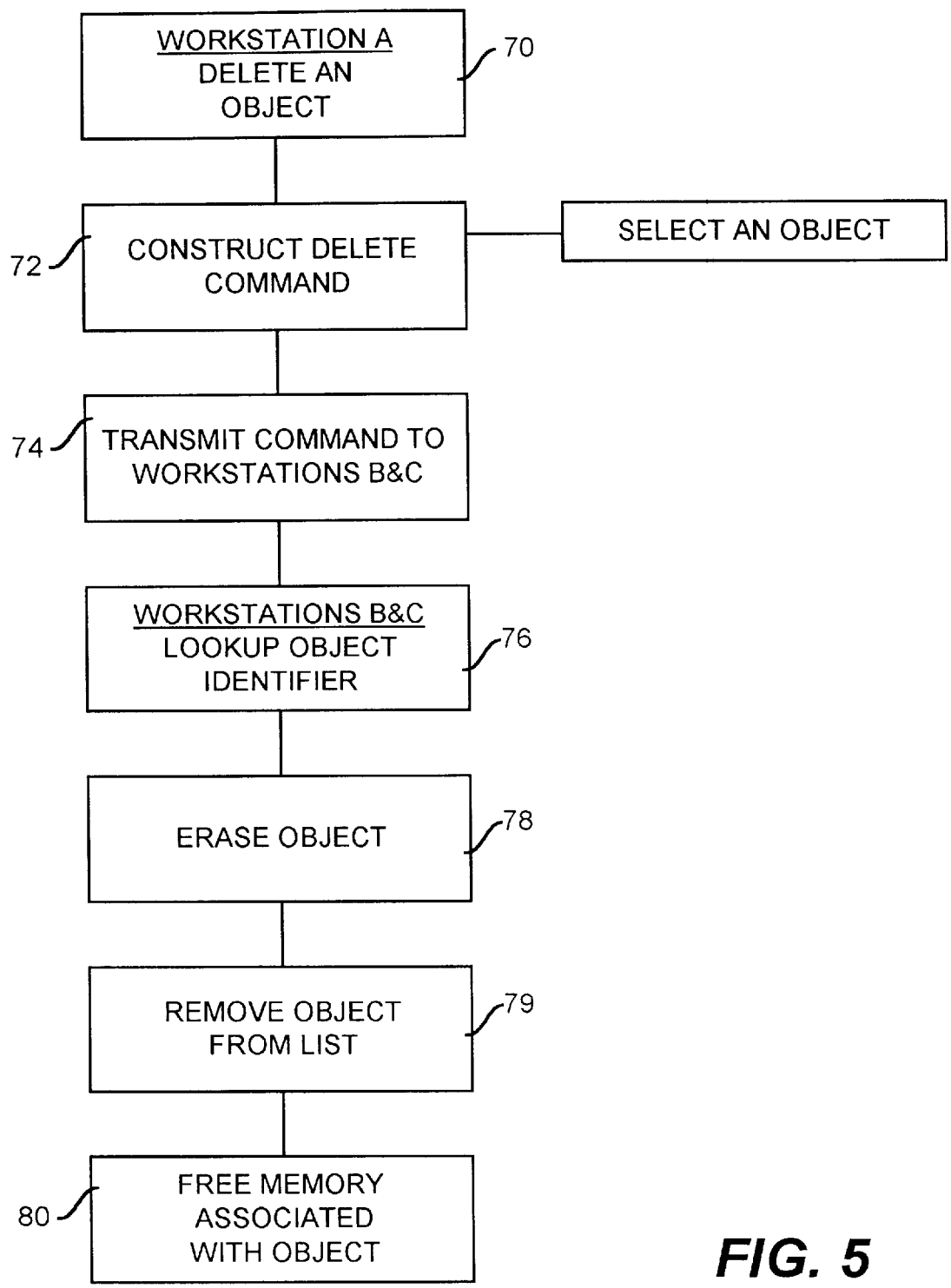
FIG. 5 is a schematic diagram of the method for deleting a graphical object depicted upon the computer screens.

Similarly, if user A deletes (cuts) an object 70, as depicted, in FIG. 5, an object cut command is constructed 72. This command is transmitted to work stations B and C 74. Work stations B and C look up the object 76. They then erase the object on the screen 78 and remove the object from their list of user A's objects 79. The memory associated with the object is then freed 80.

Figure 6:
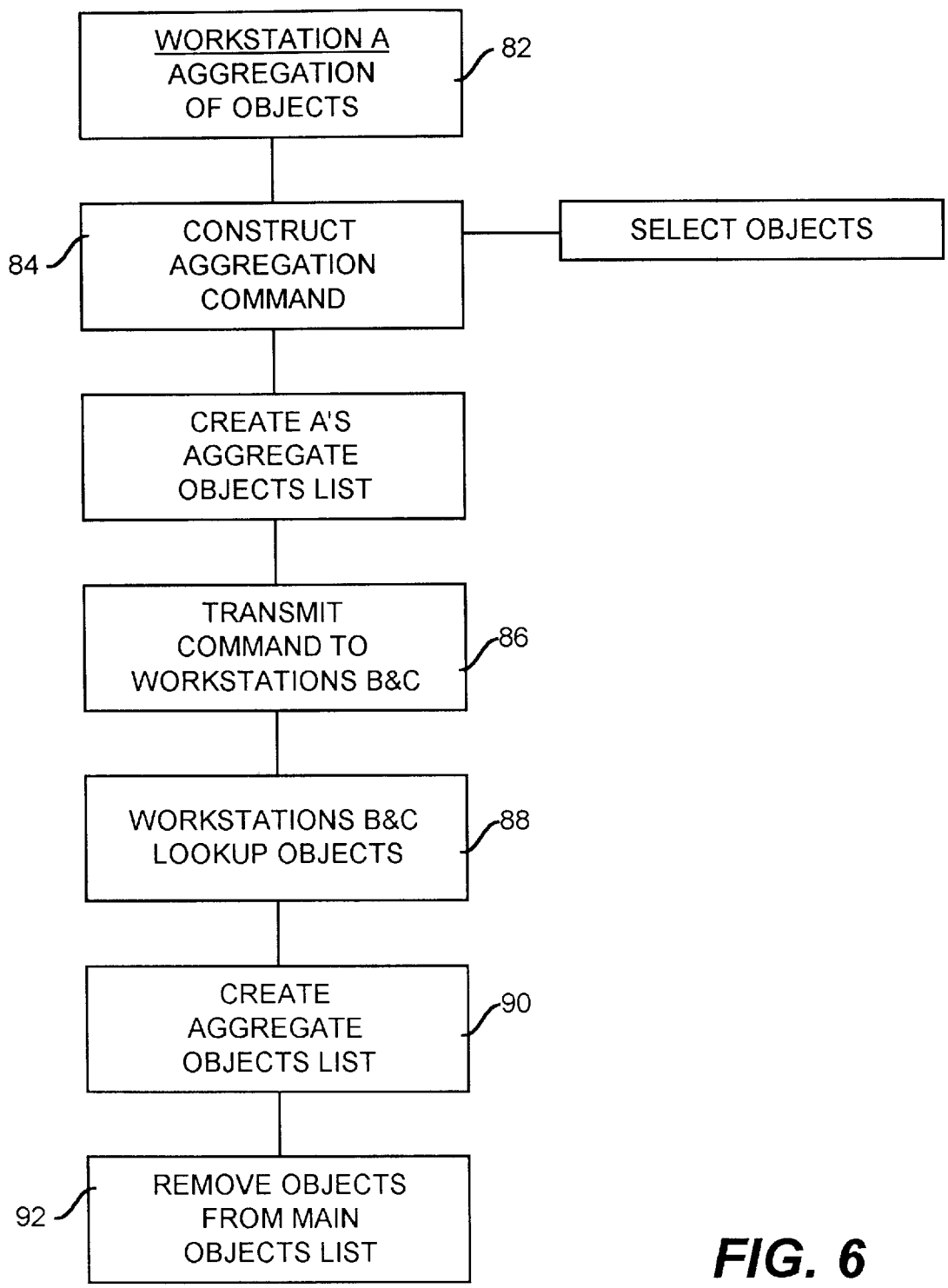
FIG. 6 is a schematic diagram of the method for aggregating graphical objects depicted on the computer screens.

If user A aggregates (combines with another) an object 82, an object aggregation command is constructed 84, see FIG. 6. This command is transmitted to work stations B and C 86. Work stations B and C look up the aggregate object to which the other object is to be added, and the other object to add as well 88. The object to aggregate is then added to the list of objects comprising the aggregate 90 and is deleted from the list of independent objects for work station A 92.

Figure 7:
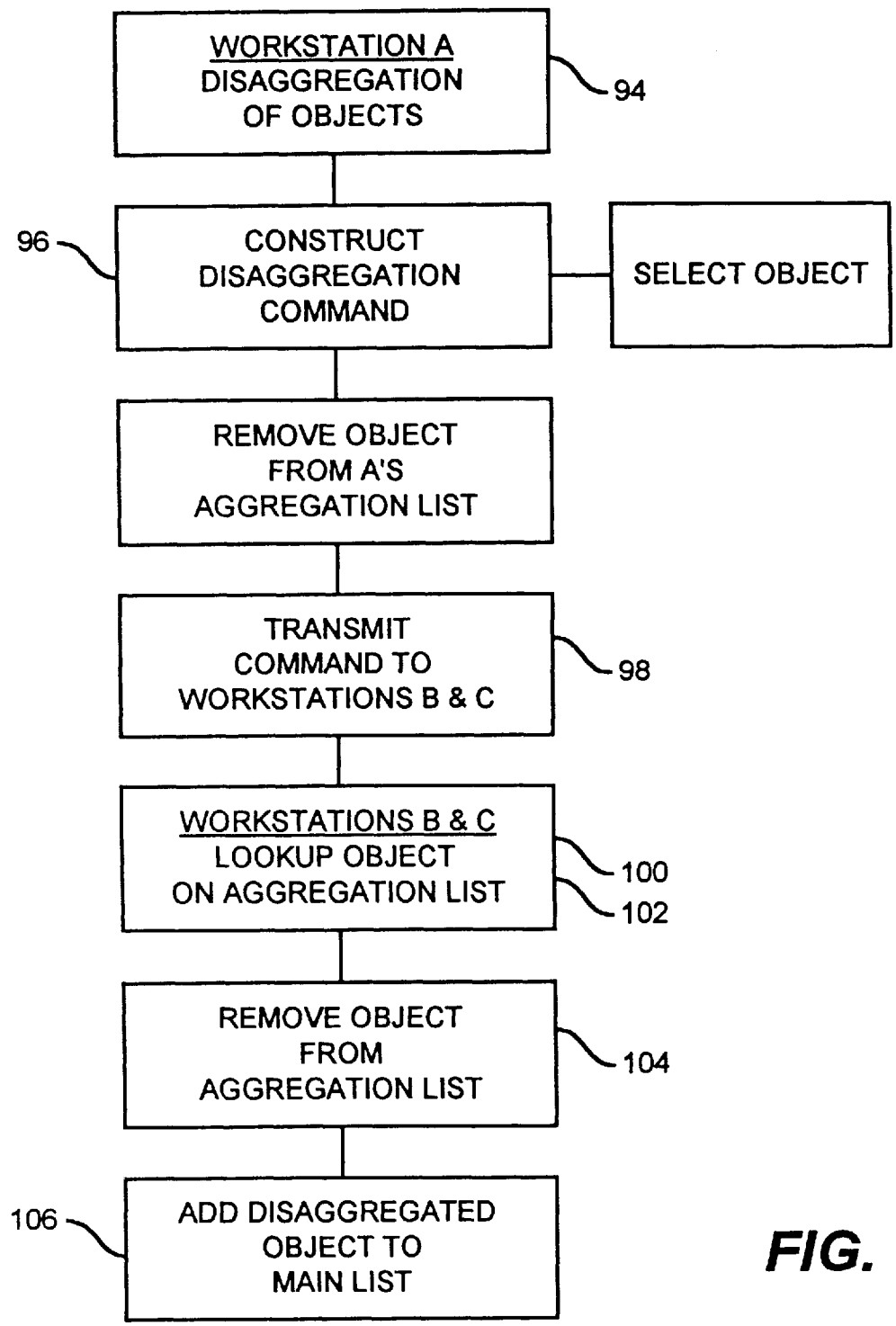
FIG. 7 is a schematic diagram of the method for disaggregating graphical objects depicted upon the computer screens.

If user A disaggregates an object 94, an object disaggregation command is constructed 96, see FIG. 7. This command is transmitted to work stations B and C. Work stations B and C look up the aggregate on their list of user A's objects 100. They then look up the object to disaggregate on the object list associated with the aggregate 102. They then remove the object from the aggregate's list 104 and add it to the main list 106 of independent objects for work station A. Aggregate objects can also be nested. That is, an aggregate object can consist of other aggregate objects, which can in turn consist of other aggregate objects.

In order to accomplish the sharing of graphical information over a network, a protocol is necessary to allow each machine to describe what is happening locally to every other machine in the conversation. This protocol consists of a set of commands which are transmitted over the network. Some of the commands refer to graphical objects. The essence of a particular set of commands is to transmit the contents of a screen in terms of the objects on the screen and operations on the objects. Objects are described in the most concise fashion necessary to capture their essence. In the preferred embodiment, each command consists of a fixed length portion followed by a (possibly empty) variable length-portion. The fixed length portion describes the type of command and the length of the variable portion. The variable portion contains the detailed information needed to properly process the command. For example, for moving an object, the fixed length portion will identify the type of command and the length of the variable length portion. The variable portion will contain the identifier for the object as well as the displacement of the object. The protocol consists of the following type of commands.

| Command | Description |
| --- | --- |
| Add New Object | A new object has been added to the local screen |
| Move Object | An object has been moved |
| Resize Object | An object's size has been changed |
| Cut Object | An object has been deleted from the local screen |
| Add Object to Aggregate Object | An object has been added to an aggregate |
| Remove Object From Aggregate | An object has been removed from an aggregation |
| Clear Screen | All objects have been removed from the local screen |
| Begin special mode | A special mode (e.g., Text Entry) has been entered |
| Special mode data | Data corresponding to an already-entered special mode |
| End special mode | The previously entered special mode has been terminated |

Commands are not limited to this set and additional commands can be added as needed. For example, commands to rotate and duplicate an object could be added, and commands to change aspects of an object description, such as fill pattern, line style or color can also be added.

As described above, each command consists of a fixed length portion followed by a variable length portion. The fixed length portion of a command is described by the following table, wherein each field is 32 bits in length in the preferred embodiment. It is not necessary to specify a user identifier in a command since a separate logical connection is used between each pair of machines in a conversation.

Command Type
Command Detail
Length
Command Detail
Pointer

The contents of the variable length portion, called the command details, varies depending on the type of command and object, as described in the following table:

| Command | COMMAND DETAILS (VARIABLE LENGTH) |
| --- | --- |
| Add New Object | Object Description |
| Move object | Object Identifier; Displacement to new location |
| Resize object | Object Description Details |
| Cut Object | Object Identifier |
| Add Object to Aggregate Object | Object Identifier of Aggregate Object; Object Identifier of Object added to Aggregate |
| Remove Object From Aggregate | Object Identifier of Aggregate Object; Object Identifier of Object removed from Aggregate |
| Clear Screen | None |
| Begin special mode | Special mode type indicator, Location |
| Special mode data | Depends on mode type |

-continued

| Command | COMMAND DETAILS (VARIABLE LENGTH) |
| --- | --- |
| End special mode | Object Identifier with which to tag resultant object |

The object description portion of a command detail (used for the add new object command) also consists of a fixed length portion and a variable length portion. The fixed length portion contains information which is not specific to a particular type of object, while the variable portion contains information which is unique to objects of that type. For example, the fixed length portion of the object description contains the object identifier, the object type and the object location. In the preferred embodiment, the fields of the fixed length portion are 32 bits in length. Location information consists of 16 bits each for horizontal (x coordinate) and vertical (y coordinate) position.

A fixed length portion of an object description is as follows:

Object Identifier
Object Type
Object Location
Object Detail Length
Object Bounding Box
Object Detail Pointer The object bounding box is the rectangle which fully contains the object. It is used in the object selection logic to facilitate local object editing. If a point in a window is not in an object's bounding box, then that point can not be used to select the object for editing. Additional elements can be added to the fixed length portion as needed. For example, it is possible to add elements such as line width, line style, fill pattern and color.

The contents of the variable length portion of the object description depends on the object type. For example, for a circle, the variable length object details consist of the location of the center of the circle and its radius. The variable length object details for several possible objects are described in the following table:

| | |
| --- | --- |
| Scribble | Point List; Point Count |
| String | Array of characters in string; Length of character array; Location of string; Location of current character |
| Text | Array ot strings in text; Length of string array |
| Square | Location of upper left; Length of side |
| Rectangle | Location of upper left; Width; Height |
| Circle | Location of center; Radius |
| Ellipse | Location of center; Width; Height |

Additional objects can be added as needed, and the description of an object can change. For example, strings could be modified to include the font to use to render the string.

Structuring the description of a graphical object in this fashion allows a virtually infinite variety of different types to be represented, since the object details can be of whatever length is necessary to fully describe any object and since the object details can be interpreted in any manner necessary, depending on the object type. Furthermore, structuring object descriptions in this fashion allow their transmission over a network in relatively simple fashion.

In the preferred embodiment, when the object description is transmitted and received, the fixed length portion and variable length portion are contiguous. When the object description is received, the buffer containing its description may be decomposed into the fixed length portion and variable. length portion. The object header and details are not necessarily stored in contiguous memory. In fact, the detail information may not be in contiguous memory either. The detail information may contain pointers to other areas in memory. This is the case with text, which is stored as an array of pointers to character strings.

There are two traditional problems with networking protocols which exchange binary data, as does the present invention. The first is byte ordering, and the second is holes due to data alignment. Byte ordering refers to the manner in which different machines store quantities of more than 8 bits in length. Some processors (such as DEC TAX processors and Intel 8086-family processors) store the high order portion in high memory. Other processors (Sun SPARC, Motorola 68000 and 88000) store the high order portion in low memory. Networking protocols generally have a "canonical," or standard way of transmitting such quantities. For example, TCP/IP always transmits the high order byte first, proceeding to the low order byte. Network canonical presentation of 16 and 32 bit quantities are adhered to in the preferred embodiment.

The other problem occurs in processors which force alignment on half word (16 bit) or full word (32 bit) boundaries within structures. Since the protocol information is being transmitted in a binary format, it is important for structures to be stored identically on all machines in a conversation. When this is not possible, it will be the responsibility of each machine to convert received data structures into a format usable locally. This problem will be minimized by designing the data structures to be used so that each field is naturally aligned on an appropriate boundary without holes.

For example, in the preferred embodiment, single byte quantities are not followed by half or full word quantities, and half word quantities are not followed by full word quantities. Two single byte quantities can be followed either by a half word quantity, or two single byte quantities. A half word quantity can be followed by either another half word quantity or two single byte quantities.

This protocol represents a significant improvement over fax technology, which transmits a bit map of a graphical image. Instead of transmitting a bit by bit description of the image, we transmit a description of each of the objects (e.g., squares, circles, text, etc.) which make up the image. This has two advantages. The first is concision. Describing a square by its upper left hand corner and length of side is considerably more concise than describing each bit the square contains. An image of 1000 pixels by 1000 pixels represents a million bits of information if the image is black and white, and potentially as much as 24 million bits if the image is in color. This represents a huge amount of data to transmit over a network, and would bring all but the fastest existing networks to their knees in short order.

The second advantage to this approach is preservation of information. When a bit map is transferred, there is a resultant loss of information as to the essence of the image. What was created as a set of geometric objects becomes a bunch of unrelated bits. The receiver of this bunch of bits has no way to determine from it the original constituent parts as they were drawn. All that is known is that some bits are on and some are off, but not that some of the bits represent a circle, a square, some text, etc.

In the present invention, there is another further refinement in concision. A typical computer program which stored graphical information would probably use a data structure known as a union. This type of data structure can be used to store multiple different kinds of data, while consuming only the amount of space required for the largest kind. A union can only be used for one type of data at time, since the fields representing different types may overlap. It would be impractical to use such a data structure to transmit a description over a network because potentially large parts of the union would be unused. By dividing the description of a graphical object into a fixed and variable length portion, this problem can be avoided. Only as much data as is necessary to describe a specific object is transmitted, instead of the amount necessary to describe the most detailed object. This approach has other advantages, too. The description of an object may be distributed throughout the memory of the machine on which it was created. However, in order to transmit it to another machine, it must be gathered together. Since we can accommodate descriptions of varying length, this becomes practical.

A final advantage of this approach is that it simplifies reading and writing of commands and descriptions over a network. When writing, the fixed and variable portions of a command and/or object are collected into a contiguous block of memory. They can then be written in one write operation. When a command is read, it is read in two operations. This is necessary since only the size of the fixed length portion is known. This is read in, and it indicates the length of the variable length portion (if any). This allows the variable length portion to then be read in.

Taking this approach becomes very important when communicating over a network in a graphics program. Network throughput can become constipated. Under normal circumstances, this causes read and write operations to block; that is, to cause the process requesting them to become idled until the operation can be completed. This is not acceptable for graphics programs, since the user may be in the midst of drawing something on her screen, and does not want that to be interrupted due to network constipation. Thus, the communication endpoints must be configured as non-blocking. This means that if the read or write operation cannot be completed, the operating system reports how much was transferred and returns to the calling program. This introduces a level of complexity to the application, as it must now manage the processing of partially complete operations. Doing so becomes much simpler if the data being transferred is of fixed size. Since this is not possible, the next best approach is to divide the data into a fixed length portion and a variable length portion.

Since the data sequences are in contiguous memory on writes, the process of writing the data can be essentially handled as if it was of a fixed length; that is, the complete length is known a priori. If the operation cannot be completed at once, the amount of data actually transferred is recorded. When the operation can be re-attempted, the program knows from where to resume writing, and how much to write. While the network is constipated, the commands which correspond to the user's actions are accumulated in a first-in first-out queue. When the network becomes unconstipated, the writing of the command which was partially written is completed, and subsequently queued commands are then written, until there are no more queued commands or the network again becomes constipated.

On reading, the problem is a bit more complex, since the reader does not know the length of the complete sequence. However, since there are only two parts, the operation is greatly simplified. If a read completes only partially, the amount of data read is recorded, in addition to which part of the message (either the fixed or variable) was being read. When the operation can be re-attempted, the program knows not only how much to read, but also which part of the message was being read.

The underlying mechanism of the network is not significant. Many networking protocols exist, including proprietary solutions such as DECNET and non-proprietary solutions such as DoD Internet Protocols (TCP/IP). The only requirement is that the network provide services to reliably transfer data between two machines in a timely fashion. If more than one machine is involved in the conversation, each pair of machines will have its own network connection. Further, while one preferred embodiment of this invention assumes that a connection-oriented transport service is being provided between machines, this is not necessary. A connection-less (or datagram) service can suffice. In the same way that the exact nature of the network service used is not relevant to the invention, neither is the nature of the computers involved. The productive use of this invention is not limited to work stations or personal computers. It is intended to be used in any application where graphical information is to be shared between machines on a real-time basis.

Similarly, the invention is not limited to simply displaying graphical information. For example, the graphical input may be sent to another machine to be translated into text and then sent back for redisplay. Another application of this technology would be in an environment where a computer generates a series of images for sequential display and a work station is used to display the image. The computer could essentially generate animated sequences by defining a set of objects and then sending commands which describe their movement and other changes to them (removal or cutting, resizing, rotation, etc.). Another application of this technology is in presenting graphical animation. A script describing a sequence of images could be prepared, stored and then replayed on a single machine using a single program.

The invention is in essence a means of sharing graphical information between machines. This is done by reducing the graphical information to the minimal amount of data required to represent it, and transmitting that data between machines. While the invention has been shown and described with reference to particular preferred embodiments, it will be understood by those skilled in the art that various alterations and modifications in form and detail may be made therein. Accordingly, it is intended that the following claims cover all such alterations and modifications as may fall within the true spirit and scope of the invention.

What is claimed is:

1. A method for the real-time intercommunication of information between at least any two computers among a plurality of networked computers, wherein each said computer may be a different type of computer including computers having different processor and system architecture, computers running different operating systems, and computers running different application program for generating and displaying said information, said method comprising:

executing, within each said networked computer, a computer program that controls operations within said networked computer, said computer program being adapted to control operations within each said networked computer;

each said computer adapted to transmit information in real time to any other of said computers as said information change;

each said computer adapted to asynchronously receive said information in real-time that is transmitted from any other of said computers without said receiving computer request said information;

said computer program of each said networked computer having a particular memory storage area reserved for storing information received from any particular one of each other of said networked computers;

said information received from said any particular one of said computers being stored in said memory storage area upon receipt and being retained in said memory until itercommunication between said computers is terminated so that there is no need to retransmit any of said information once received;

said computer program executing in each said networked computer having said memory storage area designated for each said networked computer, so that information received from each networked computer will be separately stored in the receiving computer for recall and usage by said receiving computer;

each said computer program associated with each said networked computer including a protocol which may be different for each said computer to promote the interpretation of information received from any of said networked computers.

2. A method as described in claim 1, wherein each said protocol includes a plurality of commands, each said command having a fixed length portion and a variable length portion.

3. A method as described in claim 2, wherein said variable length portion of said command includes a fixed length subportion and a variable length subportion, said fixed length subportion including information regarding the identification of a particular object and information identifying the length of said variable length portion, and wherein said variable length subportion contains information regarding parameters which define or identify said object.

4. A method as described in claim 2, wherein said variable length portion of at least one of said commands consists of information identifying the object and parameters describing a detail of an operation upon said object.

5. A method as described in claim 2, wherein each said networked computer includes an identical protocol having identical commands having an object identifier and an operation identifier and object description parameters so that information regarding the display or processing operation upon an object may be conveyed between said networked computers on an object-by-object basis by means of said commands.

6. The method in claim 1, wherein said information receiving computer is coupled to said network in a client-to-client manner to asynchronously receive information from a different computer on said network without having made a request for said information.

7. The method in claim 6, each said computer on said network exchanges information with at least one other computer on said network including performing an initial parameter exchange with said at least one other computer comprising the steps of exchanging a list of other computers already involved in said information exchange.

8. The method in claim 7, further comprising exchanging the program identity and program revision level each computer is using, and exchanging details such as the size of the canvas (virtual drawing area) each is computer is using locally.

9. The method in claim 6, wherein said information receiving computer is coupled to said network during an interactive session in a client-to-client manner.

10. The method in claim 1, further comprising adding a new computer to the interactive conversational session and for each newly added computer, sending to said newly added computer a complete description of all objects on the screen of each other one of said computers already involved in said conversation so that new computers not previously involved with said conversation can be included in the conversation in a real-time on-demand basis, and so that all information is available to represent said information.

11. The method in claim 1, wherein said computer program executing in at least a first one of said computers further performs the steps of:

receiving the input of an item of information into said first one of said plurality of computers;

reducing each said item of information to an object description at the time said item is received, said object description comprising a description of said information item and an identifier assigned to said item minimal set of descriptors as said item is input;

formulating a command comprising said object description and a manipulative object operation;

transmitting said command over said network to other ones of said plurality of computers engaged in interactive conversation with said first computer;

receiving said transmitted command by said other ones of said plurality of computers engaged in interactive conversation with said first computer;

storing said information in said command in memory of said other ones of said plurality of computers engaged in interactive conversation with said first computer, said memory portion being temporarily associated exclusively with information received from transmitting computer; and displaying said information from said command on the local display of said other one of said computers.

12. The method in claim 11, wherein each command involves a division of instructions into a command type portion having a fixed length and a variable length portion, in order to transmit data structures that describe objects and operations on those objects.

13. The method in claim 12, wherein said description and transmission uses object descriptors in a plurality of commands which describe the type of object manipulation that is being conducted, the object upon which it is being conducted and the location of the screen display bits at which it is being conducted, such that each of the computers in the network are provided with sufficient information to replicate the information production of the generating computers, and wherein said description is substantially a non-pixel-by-pixel representation of said information such that the representation increases the speed with which said information may be transmitted as compared to a pixel-by-pixel representation.

14. The method in claim 13, wherein said commands comprise commands for creation, resizing, moving, aggregating, and deleting an object.

15. The method in claim 14, wherein said command for creating comprises sending an indication to every computer engaged in said conversation that an object has been created on the transmitting computer; said indication of creation comprising sending a description of the object, and a unique object identifier, said object identifier being used in a subsequent reference to said object if any; upon receiving said indication by each said other computer, each said other computer adding said object to the list of objects it maintains in memory for said generating computer and drawing that object on its screen that represents the output of said generating computer; and wherein when said operation is a move object type command, constructing a command specifying the object identifier of the object moved, and the relative displacement of the new location of the object; transmitting said move object command to said other computers; and upon receipt of said command by said receiving computer, recalling said object based on said stored object identifier, and updating the object location maintained in the object description data structure in memory of said receiving computer, erasing the depiction of the object in the old location, and redrawing the depiction of the object in the new location; and wherein when said operation is a resize object type command, constructing a command specifying the object identifier of the object, and information describing the new object size and shape; transmitting said resize object command to said other computers; and upon receipt of said command by said receiving computer, recalling said object based on said stored object identifier, and updating the object size information maintained in the object description data structure in memory of said receiving computer, erasing the depiction of the object in the old location, and redrawing the depiction of the resized object; and wherein when said operation is a delete object type command, constructing a command specifying the object identifier of the object; transmitting said delete object command to said other computers; and upon receipt of said command by said receiving computer, recalling said object based on said stored object identifier, erasing the depiction of the object from the screen, and removing the object from the generating computer's list of objects; and freeing the memory associated with said deleted object; and wherein when said operation is an aggregate object type command, constructing a command specifying the object identifier of the objects to be combined, and information describing the aggregation; transmitting said aggregate object command to said other computers; and upon receipt of said command by said receiving computer, recalling said objects based on said stored object identifiers for each object to be combined, and adding said aggregate object to the list of objects for said generating computer, and deleting the objects from which said aggregate object has been created; and wherein when said operation is a disaggregate object type command, constructing a command specifying the object identifier of the aggregate objects to be separated, and information describing the disaggregation; transmitting said disaggregate object command to said other computers; and upon receipt of said command by said receiving computer, recalling said object based on said stored object identifier, and adding as independent objects to the list of objects for said generating computer, and deleting the object from which said dis aggregate object has been created.

16. The method in claim 12, wherein said variable length portion includes an object identifier.

17. The method in claim 12, wherein said variable length portion includes an object description.

18. The method in claim 12, wherein said variable length portion includes a command.

19. The method in claim 12, wherein said description and transmission uses object descriptors in a pluality of commands which describe the manipulation that is being conducted and the information upon which it is being conducted, such that each of the computers in the network are provided with sufficient information to replicate the information on the generating computer, and wherein said description has operational benefits including increases the speed with which said information may be transmitted and providing computer architecture, computer hardware and computer operating system independence.

20. The method in claim 19, wherein said information is graphical information, each command involves a division of instructions into a command type portion having a fixed length and a graphical object description portion having a variable length portion, said description uses object descriptors in a plurality of commands which describe the type of graphical object manipulation that is being conducted, the type of graphical object upon which it is being conducted and the location of the screen display bits at which it is being conducted, such that each of the computers in the network are provided with sufficient information to replicate the graphical information production of the generating computer, and wherein said description is substantially a non-pixel-by-pixel representation of said information such that the representation.

21. The method in claim 1, further comprising generating said graphical information within one of said computers, wherein said generation comprises.

defining a graphical object in terms of predetermined object dependent information;

reducing said information to a minimal object description and passing an object identifier to said object;

combining said object description and object identifier information into an add new object command;

transmitting said new object command via the network to all other computers engaged in the interactive conversation; and when said other computers in the conversation receive the information over the network, each said computer storing said information in a portion of memory reserved for information received from said particular computer.

22. The method in claim 21, further comprising preventing a receiving computer from modifying a received information on the computer which transmitted the information, but allowing said receiving computer to copy said information from memory and modify said copied information.

23. The method in claim 22, further comprising, when a first computer copies the information of another computer to the local memory of said first computer and depicts said information on the local display of said first computer, removing the preexisting drawing depiction of said information from the local display.

24. The method in claim 23, further comprising, prior to removing said preexisting drawing, storing the sequence of commands that were utilized to create the to be erased drawing in memory storage for subsequent retrieval and use.

25. The method in claim 21, further comprising depicting said stored information from the command on the local display in an area designated for said depiction.

26. The method in claim 1, wherein said method providing greater concession by parametrically describing each information instead of a bit-mapped representation and thereby reducing the amount of data to transmit over said network.

27. The method in claim 1, wherein said information comprises graphical information.

28. The method in claim 1, wherein said real-time inter communication between said plurality of networked computers is accomplished by multi-casting over said network, said multi-casting including transmit said information to at least one other of said computers but fewer than all of said networked computers.

29. The method in claim 1, wherein said method further comprises:

generating, by one of said computers, an animated sequence of graphical information by defining a set of objects;

providing commands which describe manipulations of said objects, said manipulations including movements of said objects and changes to said objects, said changes to said objects including removal, resizing, and rotation.

30. The method in claim 1, wherein said information is a graphical information, said method further comprising parametrically describing each graphical information instead of a bit-mapped graphical description of said graphical information, such that greater concession is achieved and the amount of data transmitted over said network is reduced as compared to a bit-mapped representation.

31. A method for the real-time interactive on-demand inter communication of information between a plurality of computers in a client-to-client network, wherein each said computer may be a different type of computer including computers having different processor and system architecture, computers running different operating systems, and computers running different application programs for generating or displaying said information, said method comprising the steps of:

defining a command protocol that provides a set of information to represent an object so that each object is separately identifiable and can be processed independently from other objects within or among any of said networked computers, including objects that may be displayed concurently on the same display screen, said command protocol representing each said object in a form that is indepedent of the type of computer or display device on which said object may be rendered for viewing;

storing said set of information characterizing each said object in said command protocol;

transmitting said information characterizing each said object to another of said networked computers in real-time when said information is generated independent of any request for such information by any other one of said computers; and receiving said information characterizing each said object from another of said networked computers when said information is transmitted, each said computer adapted to asynchronously receive said information in real-time after it is transmitted from another of said computers without said receiving computer requesting said information; and storing said received information according to said protocol in a memory area in said computer reserved for the storage and optional recall and usage of information received from each other of said networked computers specifying said object characteristics, said information received from said any particular one of said computers being stored in said memory storage area upon receipt and being retained in said memory until intercommunication between said computers is terminated so that there is no need to retransmit any of said information once received.

32. The method as in claim 31, further comprising the step of converting said received information to said predefined command protocol when said received information does not conform to said protocol.

33. A method as described in claim 31, wherein said protocol includes a plurality of commands, each said command having a fixed length portion and a variable length portion.

34. A method as described in claim 24, wherein said variable length portion of at least one of said commands comprises information identifying the object and parameters describing a detail of an operation upon said object.

35. A method as in claim 31, wherein said characterization of objects comprises the steps of:

identifying a set of parameters that uniquely describe each type of object to be generated;

establishing an identification parameter that is associated with each type of object;

whereby the selection by a user of a particular one of said object identifiers provides an associated set of descriptive parameters for each of said object which will uniquely enable said computer to manipulate said object.

36. A method as in claim 35, wherein one of said objects is a circle, said parameters associated therewith includes the radius of said circle, and said location point parameter is the center of said circle.

37. A method as in claim 35, wherein said fixed length portion contains information related to said identification parameter, and the length of said variable length portion; and said variable length portion includes information related to said parameters.

38. The method in claim 35, wherein said object manipulation includes optionally displaying an image of said object upon a computer display screen.

39. A system for the bi-directional simultaneous real-time interactive manipulation of information including at least one object among a plurality of interconnected computers and for communicating said information between a plurality of networked computers, said system comprising:

a command protocol stored in said computer to define the interpretation of information received from any of said networked computers, said protocol including a command format that identifies characteristics of said objects in a parameterized form different from a bit-mapped graphical representation;

said command protocol providing a basis set of information to represent said information so that when said information includes more than one object each said object is separately identifiable and can be processed independently from other of said objects within or among any of said networked computers, said command protocol representing each said object in a form that is independent of the type of device on which said object may be rendered for viewing;

a first memory area defined in each said computer for storing said characterics of said objects generated on said computer according to interpretation of said command protocol;

a plurality of seperate memory areas defined in each said computer for storing and optionally recalling and using information received from each other of said networked computers specifying said object characteristics;

means for asynchronously receiving information substantially in real-time without requesting said information from another of said networked computers; and means for storing said received information in said seperate memory areas devoted to information received from any particular one of said plurality of computer according to interpretation of said protocol, and for maintaining storage of all such data received until inter communication between said computers terminates.

40. A system as in claim 39, wherein a plurality of said independently identifiable object can be processed to join said plurality of objects into a new independently identifiable object.

41. A system as in claim 40, wherein said information in said protocol command format comprises:

information identifying a set of parameters that uniquely describe each type of object to be generated; and information establishing an identification parameter that is associated with each type of object;

said information in said command format including a fixed length portion and a variable length portion; said fixed length portion including information related to said identification parameter and the length of said variable length portion, and said variable length portion including information related to said parameters.

42. A system as in claim 41, further comprising a user interface to each said networked computer for generating objects within a particular one of said networked computers.

43. A method for the inter communication of information between at least two interconnected computers, each said computer having an arbitrary architecture, executing an arbitrary operating system, and executing arbitrary application programs for manipulating said information, said method comprising:

executing, within each said computer, a computer program that controls operations within said computer;

each said computer adapted to transmit and/or receive information substantially in real time to any other of said computers as said information changes;

at least one of said computers adapted to asynchronously receive said information substantially in real-time that is transmitted from any other of said computers without said receiving computer requesting said information;

said computer program of each said interconnected computers having a particular memory storage area reserved for storing information received from any particular one of each other of said computers;

said information received from said any particular one of said computers being stored in said memory storage area upon receipt;

said computer program executing in each said computer having said memory storage area designated for each said computer, so that information received from each said computer will be separately stored in the receiving computer for recall and usage by said receiving computer;

each said computer program associated with each said computer including a protocol which may be different for each said computer to promote the interpretation of information received from any of said other computers.

* * * * *